(12) United States Patent
Cheong et al.

(10) Patent No.: US 7,668,073 B2
(45) Date of Patent: Feb. 23, 2010

(54) HYBRID DISK AND METHOD OF WRITING DATA TO AND/OR READING DATA FROM THE HYBRID DISK

(75) Inventors: Young-min Cheong, Seoul (KR); Jung-wan Ko, Suwon-si (KR); Jin-kyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 11/391,436

(22) Filed: Mar. 29, 2006

(65) Prior Publication Data
US 2006/0221803 A1 Oct. 5, 2006

(30) Foreign Application Priority Data
Apr. 2, 2005 (KR) ................ 10-2005-0027828

(51) Int. Cl.
*G11B 3/70* (2006.01)
(52) U.S. Cl. .............. 369/288; 369/94; 430/270.11; 428/64.4
(58) Field of Classification Search ............ None
See application file for complete search history.

(56) References Cited

U.S. PATENT DOCUMENTS

| | | | |
|---|---|---|---|
| 5,989,670 A * | 11/1999 | Kaneko et al. | 428/64.1 |
| 6,343,060 B1 * | 1/2002 | Ko | 369/275.1 |
| 6,944,116 B2 * | 9/2005 | Nakamura et al. | 369/283 |
| 7,002,887 B2 * | 2/2006 | Kakiuchi et al. | 369/59.12 |
| 2004/0105381 A1 * | 6/2004 | Sabi | 369/275.4 |
| 2005/0094526 A1 | 5/2005 | Kakiuchi et al. | |

FOREIGN PATENT DOCUMENTS

| | | |
|---|---|---|
| EP | 0 520 619 | 5/1992 |
| EP | 0 886 269 | 12/1998 |
| JP | 11120617 | 4/1999 |
| JP | 11312336 | 11/1999 |
| JP | 2000331381 | 11/2000 |
| JP | 2001176129 | 6/2001 |
| JP | 2001202655 | 7/2001 |
| JP | 2004342283 | 12/2004 |

(Continued)

OTHER PUBLICATIONS

Search Report issued in European Patent Application No. 067372738.7 on Dec. 5, 2008.

(Continued)

*Primary Examiner*—Joseph H Feild
*Assistant Examiner*—Tawfik Goma
(74) *Attorney, Agent, or Firm*—Stein McEwen, LLP (57) ABSTRACT

A hybrid disk useable with a recording and or reproducible apparatus having an optical pickup. The hybrid disk includes a first recording layer having a first format on which data is recordable or readable by a first format beam and a second recording layer having a second format on which the data is recordable or readable by a second format beam. The transmivities and reflectivities of the first and second recording layers are interrelated to control relative intensities of the first and second format beams incident on the optical pickup.

21 Claims, 7 Drawing Sheets

FOREIGN PATENT DOCUMENTS

| | | |
|---|---|---|
| TW | 573298 | 1/2004 |
| TW | 200415636 | 8/2004 |
| WO | WO 03/083851 A1 | 10/2003 |
| WO | WO 03083851 A1 * | 10/2003 |
| WO | 2006/062036 | 6/2006 |
| WO | WO 2006/107160 | 10/2006 |

OTHER PUBLICATIONS

Search Report issued in Korean Patent Application No. 2006-1157 on Jun. 23, 2006.

* cited by examiner

HYBRID DISK AND METHOD OF WRITING DATA TO AND/OR READING DATA FROM THE HYBRID DISK

CROSS-REFERENCE TO RELATED APPLICATIONS

This application claims the benefit of Korean Application No. 2005-27828, filed Apr. 2, 2005, in the Korean Intellectual Property Office, the disclosure of which is incorporated herein by reference.

BACKGROUND OF THE INVENTION

1. Field of the Invention

Aspects of the present invention relate to an optical disk, and more particularly, to a hybrid disk including first and second recording layers that are different in format from each other.

2. Description of the Related Art

Generally, optical disks are manufactured by employing one of a variety of formats such as a compact disk (CD) format, a digital versatile disk (DVD) format, a high density digital versatile disk (HD-DVD) format, and a blu-ray disk (BD) format.

Recently, a hybrid disk having recording layers that are different in format from each other has been proposed. Wavelengths of beams for writing and reading data on or from the respective recording layers are different from each other. For example, a recording layer having the CD format and a recording layer having the DVD format, or a recording layer having the DVD format and a recording layer having the BD format, or a layer having the CD format and a layer having the BD format can be formed on a single optical disk.

Since the hybrid disk includes recording layers different in format from each other, the data written on the hybrid optical disk can be read by both an existing player and a new player. For example, when the hybrid disk includes recording layers respectively having CD and DVD formats, the hybrid disk can be used in a CD player or a DVD player.

In the hybrid disk, focus servo control is performed using a focus error signal (FES) detected by irradiating a beam having a wavelength proper for each recording layer and using the amplitude of a radio frequency signal (RFS).

However, when the focus servo control is performed by irradiating a beam having a predetermined wavelength to one of the recording layers of the hybrid disk, crosstalk may be generated since a beam reflected from another of the recording layers has a predetermined intensity. That is, in an S-curve, in addition to a signal component reflected from one of the recording layers, a beam having a predetermined intensity or more is reflected from another layer and detected to disturb the focus servo control. For example, in a hybrid disk including a first recording layer having the DVD format and a second recording layer having the HD-DVD format, when the focus servo control is performed by irradiating a beam having a wavelength of about 650 nm to read data from the first recording layer, a part of the beam transmitted through the first recording layer, which has a predetermined intensity or more, is reflected from the second recording layer. In this case, an optical pickup device erroneously determines the hybrid disk as a dual layer DVD disk. This may cause a malfunction of the player.

Therefore, in the hybrid disk including recording layers that are different in format from each other, when the data is read from one of the recording layers, the reflectivity and transmissivity of the other recording layers must be properly set so that the intensity of the beams reflected from the other recording layers can be reduced to be lower than a predetermined level.

SUMMARY OF THE INVENTION

As aspect of the present invention provides a hybrid disk that is compatible for writing and/or reading apparatuses that are different in format from each other. Other aspects of the present invention provide an apparatus for and method of writing data to and/or reading data from a hybrid disk.

According to an aspect of the present invention, there is provided a hybrid disk having a plurality of recording layers that are different in a format from each other, including: a first recording layer to and/or from which data are written or read by a first format beam; and a second recording layer to and/or from which data are written or read by a second format beam, wherein a reflectivity of the second recording layer with respect to the first format beam and/or an intensity of the second format beam reflected from the first recording layer is less than a predetermined level.

The reflectivity of the second recording layer with respect to the first format beam may be less than $1/2$-$1/10$ of that of the first recording layer with respect to the first format beam.

The first recording layer may include at least one metal layer and the second recording layer may include at least two metal layers and at leas one dielectric layer disposed between the metal layers. In this case, the metal layer of the first recording layer may be formed of Ni, the metal layers of the second recording layer may be formed of Al, and the dielectric layer of the second recording layer may be formed of $ZnS$—$SiO_2$. In addition, a thickness of the metal layer of the first recording layer may be 35 nm, a thickness of each metal layer of the second recording layer may be 10 nm, and a thickness of the dielectric layer of the second recording layer may be less than 25 nm.

Alternatively, the first recording layer may include at least two metal layers and at least one dielectric layer disposed between the metal layers and the second recording layer may include at least one metal layer. In this case, the metal layers of the first recording layer may be formed of Al, the dielectric layer of the first recording layer may be formed of $ZnS$—$SiO_2$, and the metal layer of the second recording layer may be formed of Al. In addition, a thickness of each metal layer of the first recording layer may be 10 nm, a thickness of the dielectric layer of the first recording layer may be 38 nm, and a thickness of the metal layer of the second recording layer may be more than 12 nm.

The first recording layer may have a DVD format and the second recording layer may have an HD-DVD format.

According to another aspect of the present invention, there is provided an apparatus for writing data to and/or reading the data from a hybrid disk having a plurality of recording layers that are different in format from each other, the apparatus including: a writing/reading unit writing the data to and/or reading the data from a first recording layer using a first format beam, writing and/or reading the data on and/or from a second recording layer using a second format beam, and allowing reflectivity of the second recording layer with respect to the first format beam to be less than a predetermined level when writing the data to and/or reading the data from the first recording layer using the first format beam; and a control unit controlling the writing/reading unit to write or read the data to or from the hybrid disk.

According to another aspect of the present invention, there is provided a method of writing data to and/or reading data from a hybrid disk having a plurality of recording layers that are different in format from each other, the method including: writing or reading the data to or from a first recording layer of the hybrid disk using a first format beam; writing or reading the data to or from a second recording layer of the hybrid disk using a second format beam, wherein a reflectivity of the second recording layer with respect to the first format beam is less than a predetermined level when writing or reading the data on or from the first recording layer using the first format beam.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to embodiments of the present invention, a hybrid disk comprises two recording layers that are different in format from each other and data can be written to and/or read from the recording layers.

In the following description of the embodiments, one of the two recording layers will be referred to as a first recording layer L0 and the other recording layer will be referred to as a second recording layer L1. The recording layer L0 is closer to the optical pickup than the second recording layer L1 Light beams, each having a predetermined wavelength, that are appropriate for writing data to and/or reading data from the first and second recording layers L0 and L1, will be referred to as first and second format beams.

Optical constants used in describing the embodiments of the present invention are shown in Table 1.

TABLE 1

| Wavelength of | 650 nm | | 413 nm | |
| --- | --- | --- | --- | --- |
| beam | n | k | n | k |
| Al | 1.488 | 7.821 | 0.523 | 5.024 |
| Ni | 2.02 | 3.82 | 2.44 | 0.495 |
| ZnS—SiO$_2$ | 2.32 | 0 | 2.32 | 0 |
| Polycarbonate | 1.55 | 0 | 1.55 | 0 |

In the hybrid disk using the beams that are different in wavelength from each other, the intensity of the first format beam transmitted through the first recording layer and reflected from the second recording layer must be lowered to be less than a predetermined level to prevent focus servo control errors caused by crosstalk. It can be shown experimentally that the reflectivity of the second recording layer with respect to the first format beam should be set to be less than $\frac{1}{7}$-$\frac{1}{10}$ of a reflectivity of the first recording layer and the reflectivity of the second recording layer with respect to the second format beam should be set to be more than 10% of the reflectivity of the first recording layer so that a signal having a sufficient intensity can be detected. Although the embodiments of the invention are explained with respect to wavelengths related to the HD-DVD and the bluray disks, a hybrid disk may be formed to use other combinations of wavelengths.

Figure 1:
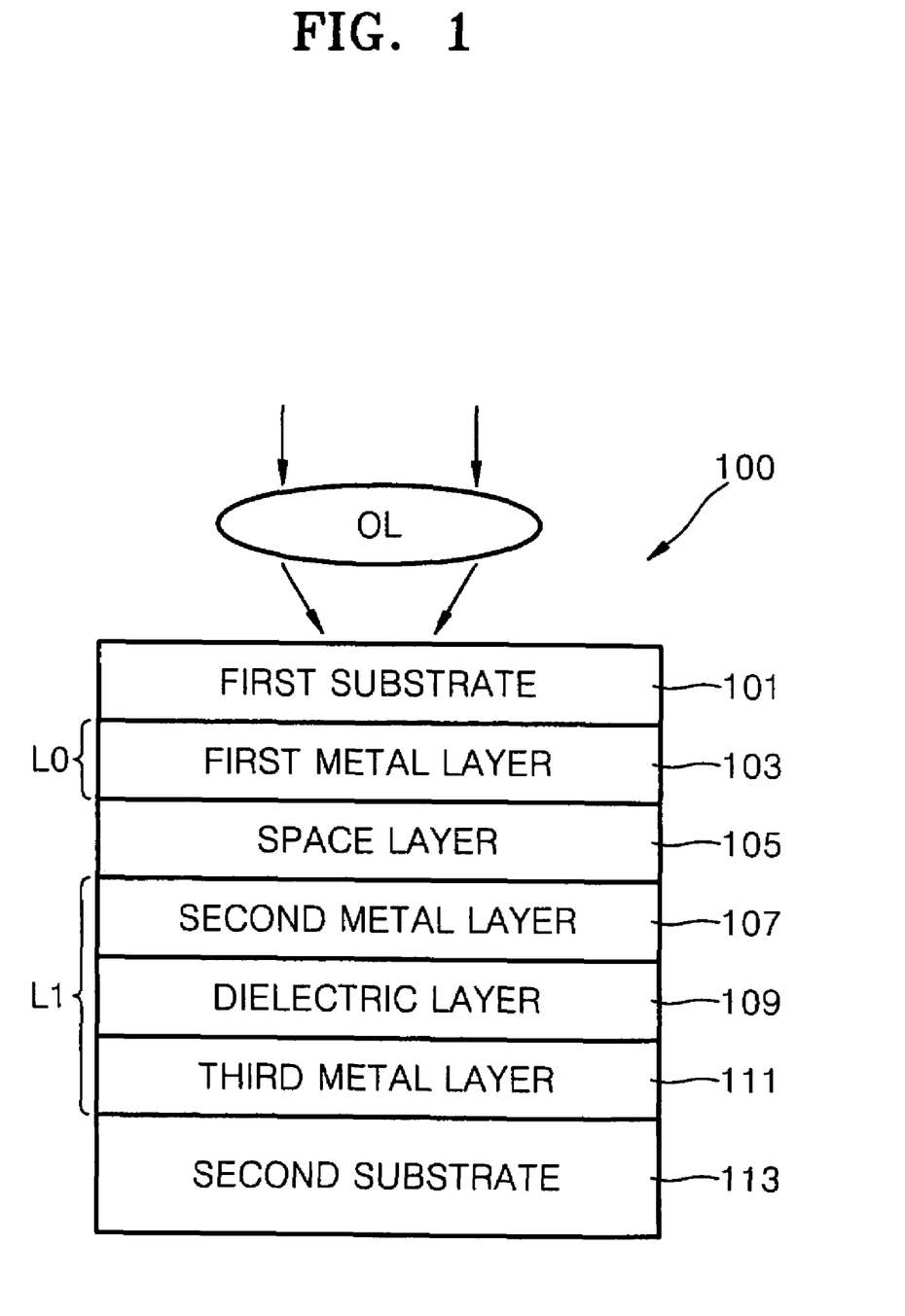
FIG. 1 is a schematic view of a hybrid disk according to an embodiment of the present invention.

FIG. 1 is a schematic view of a hybrid disk 100 according to an embodiment of the present invention. Referring to FIG. 1, the hybrid disk 100 includes a first substrate 101, a first metal layer 103, a space layer 105, a second metal layer 107, a dielectric layer 109, a third metal layer 111, and a second substrate 113.

As illustrated in FIG. 1, a beam having a predetermined wavelength is focused by an object lens OL and incident on the hybrid disk 100 through the first substrate 101 to write data to and/or read data from the hybrid disk 100.

The first substrate 101, the space layer 105, and the second substrate 113 are formed of a material selected from the group consisting of polycarbonate, polymethylmetyacrylate (PMMA), amorphous polyolefin (APO), and glass.

The first, second and third metal layers 103, 107 and 111 are formed of a material selected from the group consisting of Ni, Al, Au, Ag, Cu and an alloy thereof. The data is written on the first, second and third metal layers 103, 107 and 111 in a form of pits.

The dielectric layer 109 is formed of a material selected from the group consisting of SiOx, MgOx, AlOx, TiOx, VOx, CrOx, NiOx, ZrOx, GeOx, ZnOx, SiNx, AlNx, TiNx, ZrNx, GeNx, SiC, ZnS, ZnS—SiO$_2$, and MgF$_2$, where x is an integer.

The first metal layer 103 corresponds to the first recording layer L0 having a first format among a variety of formats such as CD, DVD, HD-DVD, and BD, and the second metal layer, the dielectric layer and the third metal layer 107, 109 and 111 correspond to the second recording layer L1 having a second format among the variety of formats. For example, two of the variety formats are respectively selected as formats of the first and second recording layers L0 and L1.

The wavelength of the first format beam for writing data to and/or reading data from the first recording layer L0 may be longer than the wavelength of the second format beam for writing data to and/or reading data from the second recording layer L1. For example, the first recording layer L0 may have a DVD format using a beam (i.e., the first format beam) having a wavelength of 650 nm and the second recording layer L1 may have an HD-DVD format using a beam (i.e., the second format beam) having a wavelength of 413 nm.

In the above-described hybrid disk, when the first format beam is irradiated to write data to and/or read data from the first recording layer L0, the reflectivity of the second recording layer L0 with respect to the first format beam reflected from the second recording layer L0 is limited to be lower than a predetermined level, thereby preventing focus crosstalk caused by the reflected beam.

In particular, in the hybrid disk according to the current embodiment of the present invention, since the second recording layer L1 includes the second and third metal layers 107 and 111 and the single dielectric layer 109, a selective wavelength property can be realized by adjusting the reflectivity and transmissivity of the first and second recording layers L0 and L1 with respect to the first and second format beams that are different in wavelength from each other.

In a conventional multi-layer read-only or recording medium, since a beam having a single wavelength is used to read data from a plurality of recording layers, the reflectivity and transmissivity of each recording layer can be adjusted by properly adjusting a thickness of each recording layer.

However, in the embodiment shown in FIG. 1, since the recording medium is the hybrid disk having the two recording layers that are different in format from each other and thus the first and second format beams that are different in wavelength from each other are used for performing the writing and reading, it is difficult to properly adjust the reflectivity and transmissivity of the first and second recording layers L0 and L1 by simply adjusting the thickness of the first and second recording layers L0 and L1.

Therefore, in the hybrid disk shown in FIG. 1, the second recording layer L1 includes at least two metal layers, the second and third metal layers 107 and 111, and at least one dielectric layer 109. Therefore, the reflectivity and transmissivity of each recording layer can be set such that, when the first format beam is irradiated to write and/or read data to/from the first recording layer L0, the intensity of the beam reflected from the second recording layer L1 can be lower than a predetermined level.

Figure 2:
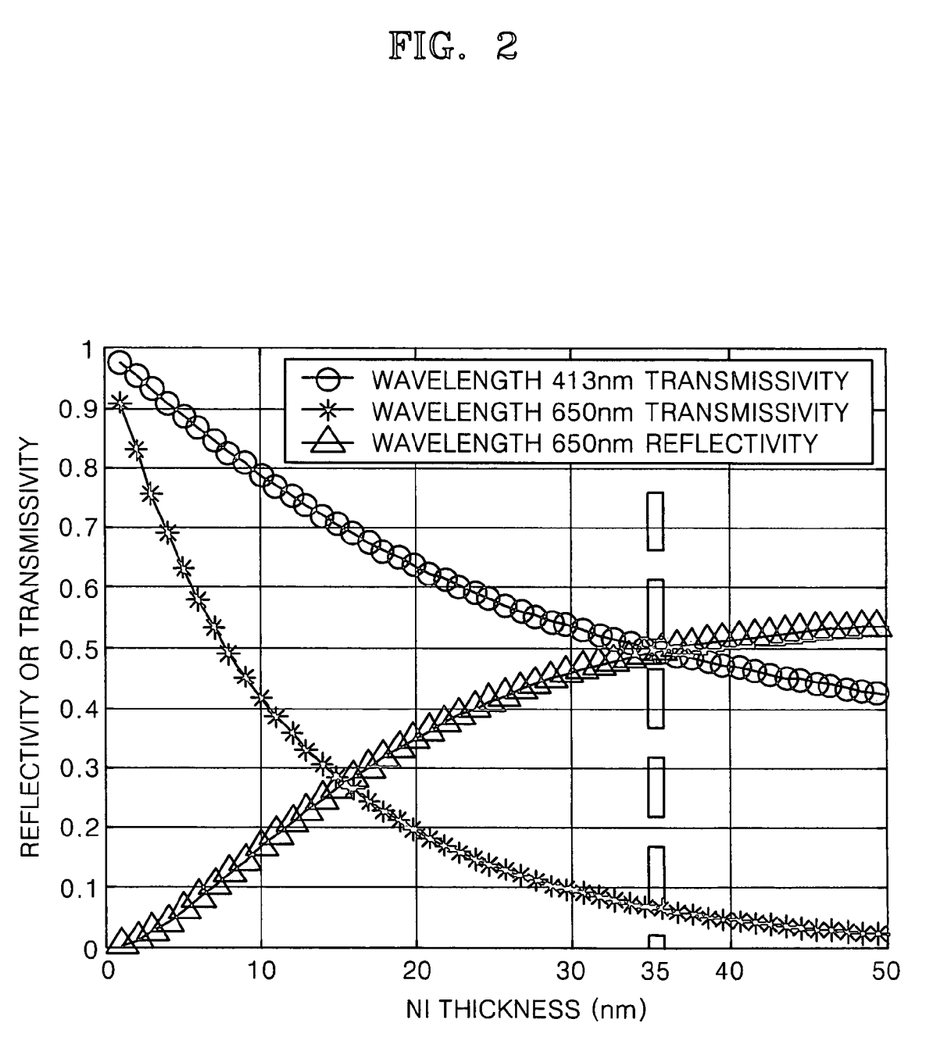
FIG. 2 is a graph illustrating the reflectivity and transmissivity of a first recording layer with respect to a first format beam and the transmissivity of the first recording layer with respect to a second format beam according to a variation of a thickness of a first metal layer in the hybrid disk shown in FIG. 1.

FIG. 2 is a graph illustrating the reflectivity and transmissivity of the first recording layer L0 with respect to the first format beam and the transmissivity of the first recording layer L0 with respect to the second format beam according to a variation of the thickness of the first metal layer 103 in the hybrid disk according to the embodiment shown in FIG. 2. Here, the first recording layer L0 has the DVD format and the second recording layer L1 has the HD-DVD format. In addition, the first recording layer L0 is formed of Ni, the wavelength of the first format beam is 650 nm, and the wavelength of the second format beam is 413 nm.

Referring to FIG. 2, as the thickness of the first recording layer L0 and the reflectivity of the first format beam gradually increase, the transmissivity of the first and second format beams is gradually reduced. For example, when the thickness of the first recording layer L0 is 35 nm, the reflectivity and transmissivity of the first recording layer L0 with respect to the first format beam having the wavelength of 650 nm are respectively 50% and 8% and the transmissivity of the first recording layer L0 with respect to the second format beam having the wavelength of 413 nm is 50%.

Figure 3:
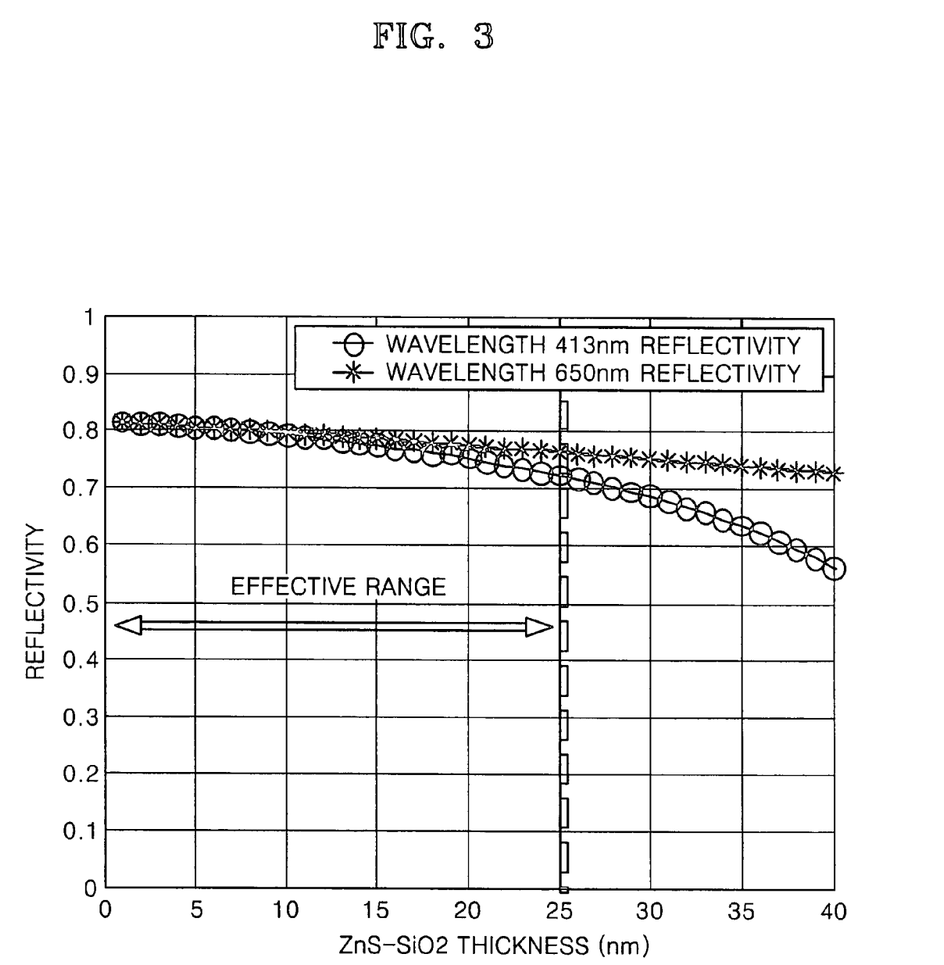
FIG. 3 is a graph illustrating the reflectivity of a second recording layer with respect to first and second format beams according to a variation of a thickness of a dielectric layer in the hybrid disk shown in FIG. 1.

FIG. 3 is a graph illustrating the reflectivity of the second recording layer L1 with respect to the first and second format beams according to a variation of the thickness of the dielectric layer in the hybrid disk shown in FIG. 2. Here, each of the second and third metal layers 107 and 111 of the second recording layer L1 is formed of an Al layer having a thickness of 10 nm and the dielectric layer 109 is formed of ZnS—SiO$_2$. In addition, as in the case of FIG. 2, a red beam having a wavelength of 650 n is used as the first format beam and a blue beam having a wavelength of 413 nm is used as the second format beam.

Referring to FIG. 3, it can be noted that, as the thickness of the dielectric layer 109 is increased, the reflectivity of the second recording layer L1 with respect to the first and second format beams is reduced.

In order to write data to and/or read data from the second recording layer L1, more than 18% of the second format beam incident on the hybrid disk must be reflected from the second recording layer L1. When the thickness of the first recording layer L0 formed of Ni is 35 nm, 50% of the second format beam reaches the second recording layer L1 through the first recording layer L0.

A percentage of the second format beam that is transmitted through the first recording layer L0, reflected from the second recording layer L1 and detected by an optical pickup device becomes $(T_{12})^2 \times R_{22} \times 100$, where $T_{12}$ is the transmissivity of the first recording layer L0 with respect to the second format beam and $R_{22}$ is the reflectivity of the second recording layer with respect to the second format beam. Therefore, where the reflectivity of the second recording layer L1 with respect to the second format beam ($T_{12}$) is 0.50, the percentage of the second format beam reflected from the second recording layer L1 and incident on the optical pickup becomes $(0.5)^2 \times R_{22} \times 100$, which must be more than 18%. That is, $(0.5)^2 \times R_{22} > 0.18$ must be satisfied. Therefore, $R_{22}$ must be greater than 0.72. That is, in order to normally write data to and/or read data from the second recording layer L1, the reflectivity of the second recording layer L1 with respect to the second format beam must be more than 0.72.

Meanwhile, in order to prevent focus cross-talk, the intensity of the first format beam transmitted through the first recording layer L0 and reflected from the second recording layer L1 must be lower than a predetermined level. A percentage of the first format beam reflected from the second recording layer L1 and detected by the optical pickup device is $(T_{11})^2 \times R_{21} \times 100$, where $T_{11}$ is the transmissivity of the first recording layer L0 with respect to the first format beam and $R_{21}$ is the reflectivity of the second recording layer L1 with respect to the first format beam. Therefore, where the percentage of the first format beam transmitted through the first recording layer L0 is 8%, ($T_{11}=0.08$), the percentage of the first format beam reflected from the second recording layer L1 and incident on the optical pickup becomes $(0.08)^2 \times R_{21}$. When the percentage of the first format beam reflected from the second recording layer L1 and incident on the optical pickup is set to be less than 5%, $0.08^2 \times R_{21} < 0.05$ must be satisfied. Therefore, $R_{21}$ may be any value in a range of 0-1. As shown in FIG. 3, when the thickness of the dielectric layer 109 is less than 25 nm, the reflectivity of the second recording layer L1 with respect to the first and second format beams becomes more than 0.72.

Figure 4:
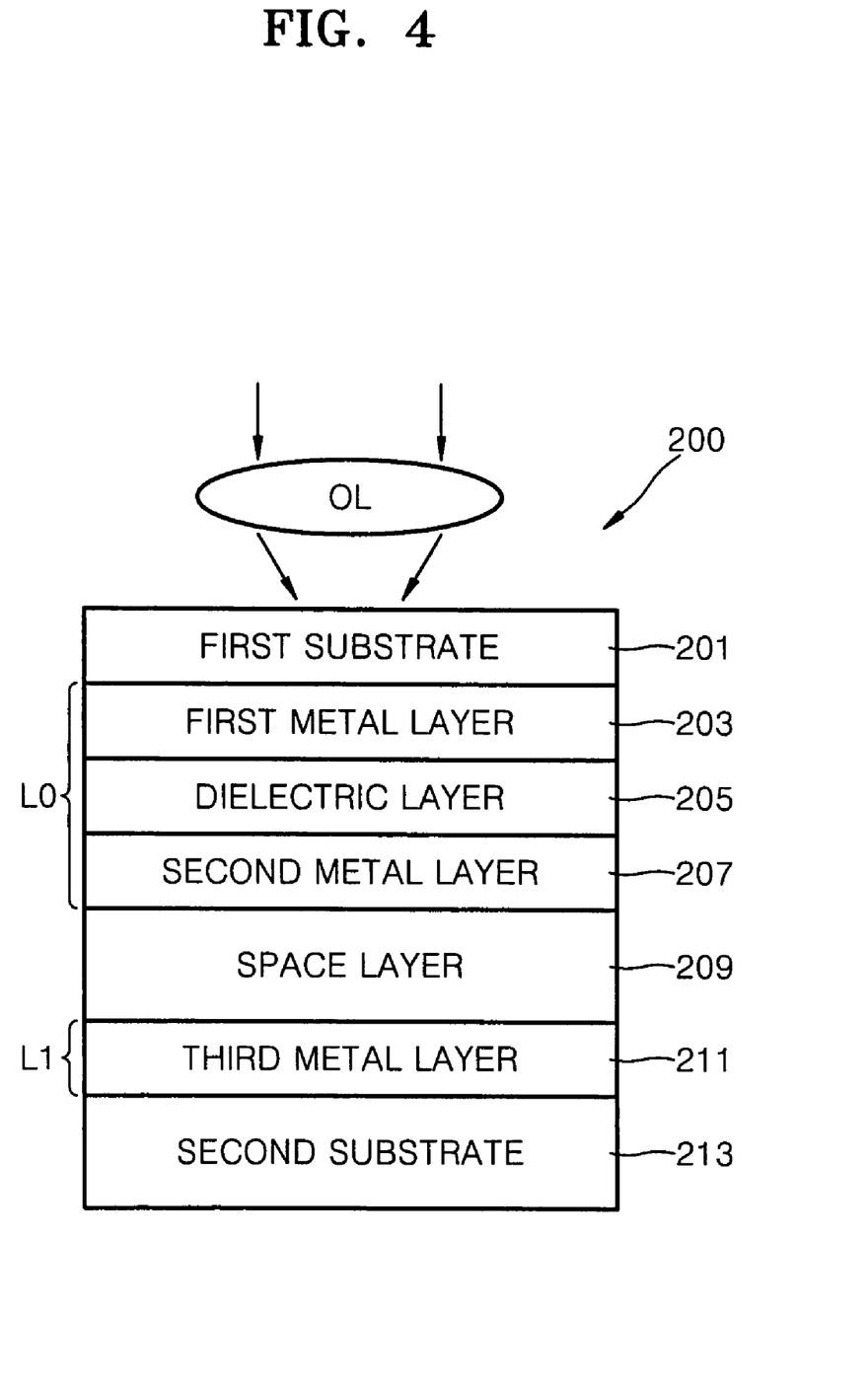
FIG. 4 is a schematic view of a hybrid disk according to another embodiment of the present invention.
Figure 5:
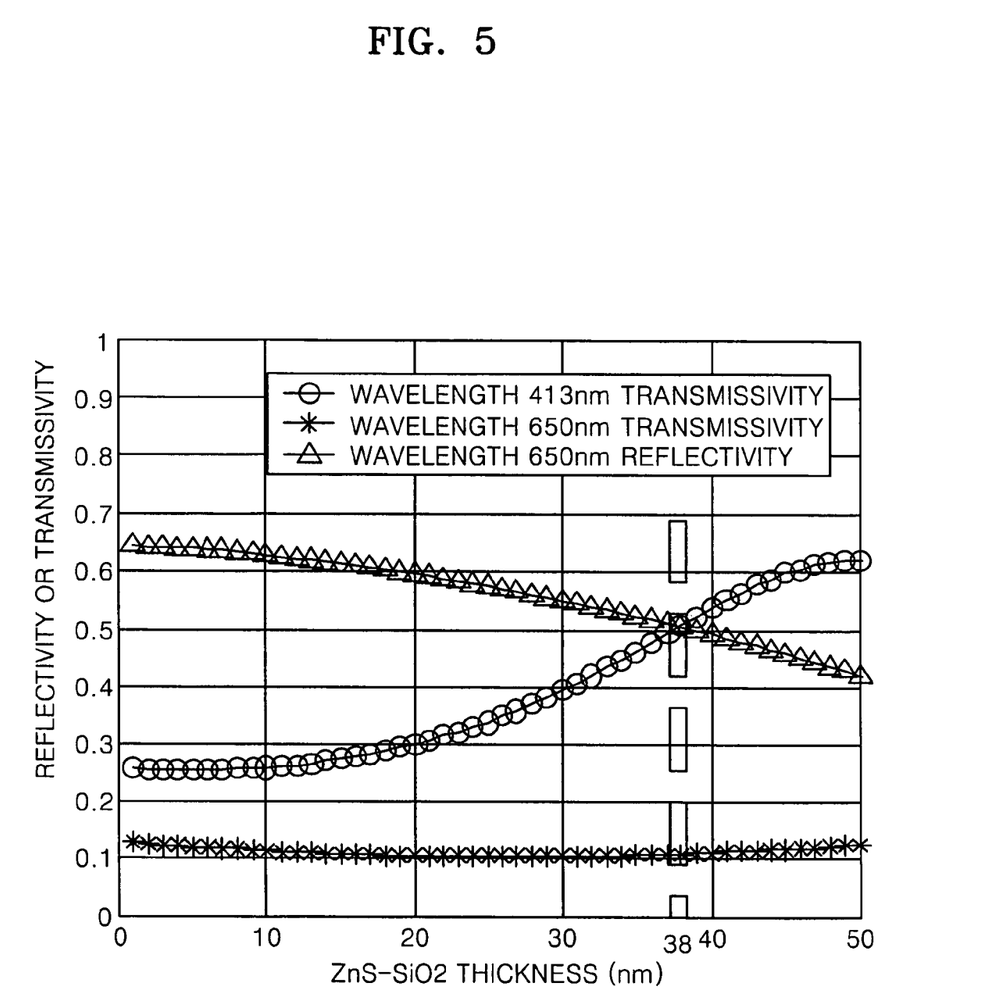
FIG. 5 is a graph illustrating the reflectivity and transmissivity of a first recording layer with respect to a first format beam and the transmissivity of the first recording layer with respect to a second format beam according to a variation of a thickness of a dielectric layer in the hybrid disk shown in FIG. 4.

FIG. 4 is a schematic view of a hybrid disk 200 according to another embodiment of the present invention. The hybrid disk 200 is constructed of similar materials as the hybrid disk 100 of the embodiment illustrated in FIG. 1. However in the embodiment shown in FIG. 4, the dielectric layer 205 and the space layer 209 are located in a same position as the space layer 105 and the dielectric layer 209, respectively, in the embodiment shown in FIG. 1. Thus, the first recording layer L0 of the embodiment shown in FIG. 4 includes first and second metal layers 203 and 207 and the dielectric layer 205 and the second recording layer L1 includes a third metal layer 211. The first and second recording layers L0 and L1 in the embodiment shown in FIG. 4 are separated by the space layer 209. A first substrate 201 is located adjacent the first metal layer 203 and a second substrate 213 is located adjacent the third metal layer 211. The first substrate 201, the first metal layer 203, the dielectric layer 205, the second metal layer 207, the space layer 209, the third metal layer 211 and the second substrate 213 of the hybrid disk 200 may be formed of the same materials as the first substrate 101, the first metal layer 103, the dielectric layer 109, the second metal layer 107, the space layer 105, the third metal layer 111 and the second substrate 113 of the hybrid disk 100, respectively FIG. 5 is a graph illustrating the reflectivity and transmissivity of the first recording layer L0 with respect to a first format beam and the transmissivity of the first recording layer L0 with respect to a second format beam according to a variation of the thickness of the dielectric layer 205 in the hybrid disk 200. As in the hybrid disk 100, the first recording layer L0 of the hybrid disk 200 has the DVD format and the second recording layer L1 has the HD-DVD format. In addition, the first and second metal layers 203 and 207 are formed of Al, the wavelength of the first format beam is 650 nm, and the wavelength of the second format beam is 413 nm.

Referring to FIG. 5, as the thickness of the dielectric layer 205 is increased, the reflectivity of the first recording layer L0 with respect to the first format beam is gradually reduced and the transmissivity of the first recording layer L0 with respect to second format beam is gradually increased. The transmissivity of the first recording layer L0 with respect to the first format beam gradually decreases to a thickness of the dielectric layer 205 of about 30 nm and then gradually increases thicknesses of the dielectric layer 205 greater than about 30 nm, remaining within a range of about 20% of the transmissivity at about 30 nm.

For example, where the thickness of the first recording layer L0 is 35 nm, the reflectivity of the first recording layer L0 with respect to the first format beam having the wavelength of 650 nm is 50% and the transmissivity of the first recording layer L0 with respect to the first format beam is 12%. The transmissivity of the first recording layer L0 with respect to the second format beam having the wavelength of 413 nm is 50%.

Figure 6:
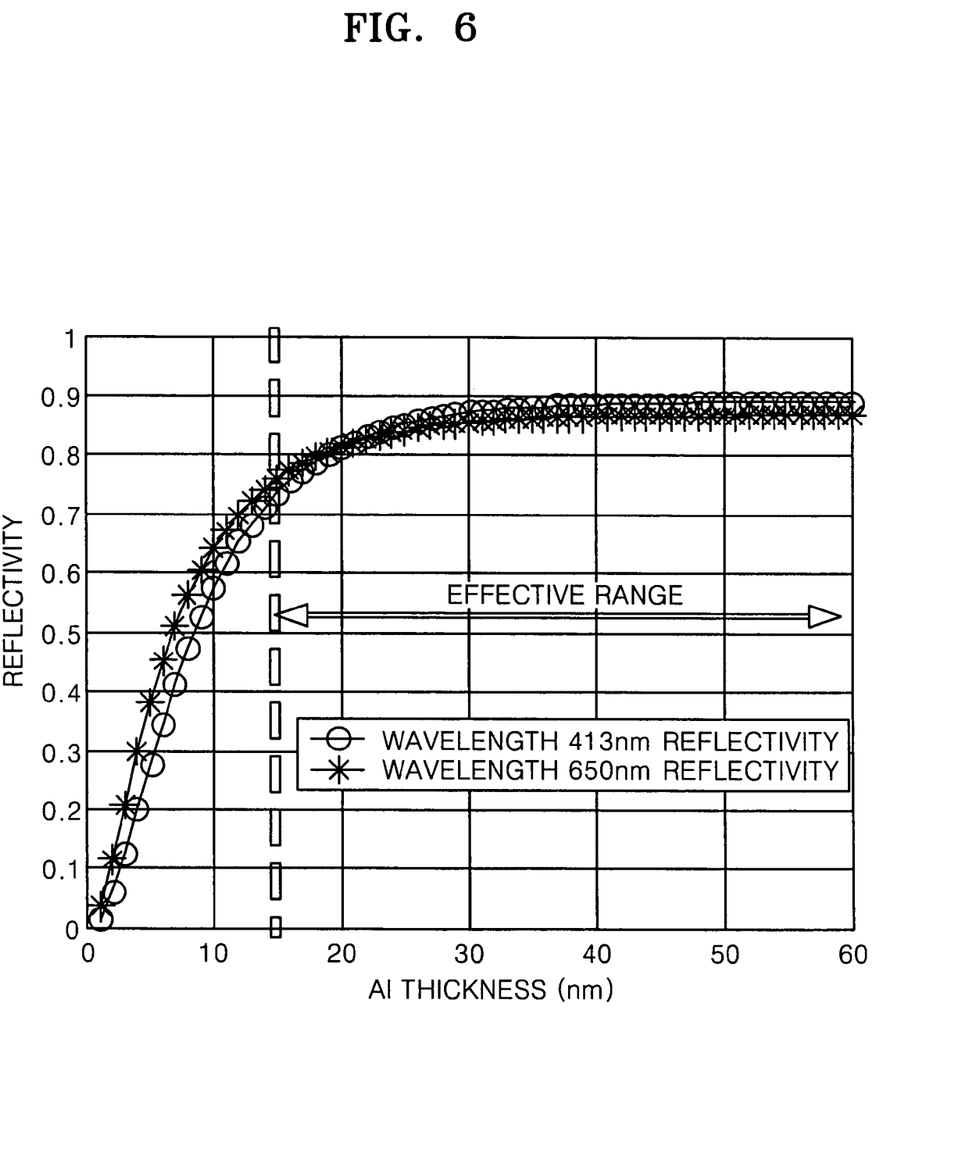
FIG. 6 is a graph illustrating the reflectivity of a second recording layer with respect to first and second format beams according to a variation of a thickness of a third metal layer in the hybrid disk shown in FIG. 4.

FIG. 6 is a graph illustrating the reflectivity of the second recording layer L1 with respect to the first and second format beams according to a variation of the thickness of the third metal layer 211.

In the example shown in FIG. 6, each of the second and third metal layers 207 and 211 of the second recording layer L1 is formed of an Al layer having a thickness of 10 nm and the dielectric layer 205 is formed of ZnS—SiO$_2$. In addition, as in FIG. 5, a red beam having a wavelength of 650 n is used as the first format beam and a blue beam having a wavelength of 413 nm is used as the second format beam.

Referring to FIG. 6, it can be noted that, as the thickness of the third metal layer 211 is increased, the reflectivity of the second recording layer L1 with respect to the first and second format beams gradually increases and saturates at about 90% at a predetermined thickness above about 30 nm.

In order to write data to and/or read data from the third metal layer 211 corresponding to the second recording layer L1, more than 18% of the second format beam incident on the hybrid disk 200 should be reflected from the second recording layer L1 and be detected by the optical pickup. When the thickness of the dielectric layer 205 of the first recoding layer L0 is 35 nm, 50% of the second format beam reaches the second recording layer L1 through the first recording layer L0.

A percentage of the second format beam that is transmitted through the first recording layer L0, reflected from the second recording layer L2 and detected by the optical pickup device becomes $(T_{12})^2 \times R_{22} \times 100$ where $T_{12}$ is the transmissivity of the first recording layer with respect to the second format beam and $R_{22}$ is the reflectivity of the second recording layer with respect to the second format beam. Therefore, where the reflectivity of the second recording layer L1 with respect to the second format beam is $R_{22}$, the percentage of the second format beam reflected from the second recording layer L1 and incident on the optical pickup device becomes $0.5^2 \times R_{22} \times 100$. This percentage must be more than 18%. That is, $0.5^2 \times R_{22} > 0.18$ must be satisfied. Therefore, $R_{22}$ must be greater than 0.72. That is, in order to normally write data to and/or read data from the second recording layer L1, the reflectivity of the second recording layer L1 must be more than 0.72.

Meanwhile, in order to prevent focus cross-talk, the intensity of the first format beam transmitted through the first recording layer L0 and reflected from the second recording layer L1 must be lower than a predetermined level. A percentage of the first format beam reflected from the second recording layer L1 and detected by the optical pickup device is $(T_{11})^2 \times R_{21} \times 100$ where $T_{11}$ is the transmissivity of the first recording layer with respect to the first format beam and $R_{21}$ is the reflectivity of the second recording layer with respect to the first format beam.

As shown in FIG. 5, the percentage of the first format beam transmitted through the first recording layer L0 is about 12%, thus the percentage of the first format beam reflected from the second recording layer L1 and incident on the optical pickup device becomes $0.12^2 \times R_{21}$. When the percentage of the first format beam reflected from the second recording layer L1 and incident on the optical pickup is set to be less than 5%, $0.12^2 \times R_{21} < 0.05$ must be satisfied. Therefore, $R_{21}$, the reflectivity of the second recording layer L1 with respect to the first format beam, may be any value within a range of 0-1. As shown in FIG. 6, when the thickness of the third metal layer 211 corresponding to the second recording layer L1 is greater than 12 nm, the reflectivity of the second recording layer L1 with respect to the first and second format beams becomes more than 0.72.

In the above embodiments, although one of the first and second recording layers L0 and L1 includes two or more metal layers and one or more dielectric layers, the hybrid disk of the present invention is not limited thereto. That is, the recording layer can have a variety of structures.

Figure 7:
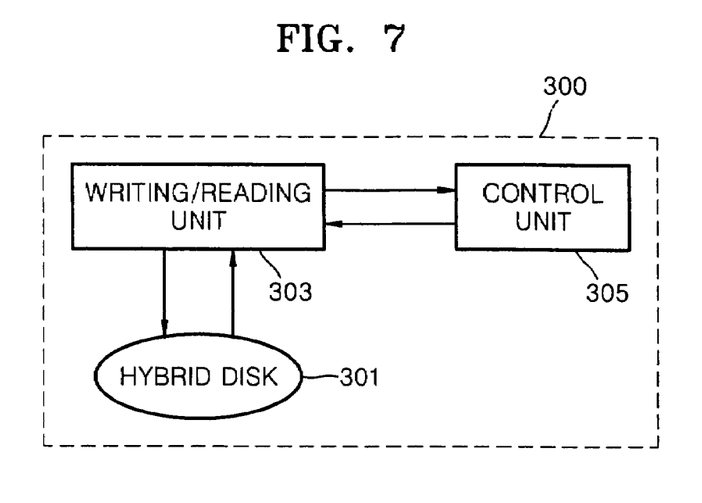
FIG. 7 is a block diagram of an apparatus for writing/reading data on/from a hybrid disk according to an embodiment of the present invention.

FIG. 7 is a block diagram of an apparatus 300 for writing/reading data to/from a hybrid disk 301 according to an embodiment of the present invention. Referring to FIG. 7, the writing/reading apparatus 300 includes a writing/reading unit 303 and a control unit 305.

The writing/reading unit 303 writes and reads data to and from the hybrid disk 301, respectively, according to the control of the control unit 305. The control unit 305 controls the writing/reading unit 303 or processes the data read by the writing/reading unit 303 to provide effective data.

The writing/reading unit 303 includes an optical pickup device for writing and reading data. The hybrid disk 301 is loaded on the optical pickup device. The optical pickup device outputs an optical signal from the control unit 305 by emitting a laser beam to the hybrid disk 301 and receiving the laser beam reflected from the hybrid disk 301. Examples of the hybrid disk 301 include the hybrid disk 100 and the hybrid disk 200 as described above.

In particular, the writing/reading unit 303 uses a first format beam having a first wavelength to write and read data to and from a first recording layer of the hybrid disk 301 and a second format beam having a second wavelength to write and read data to and from a second recording layer of the hybrid disk 301. In addition, as described above, when data is written or read to or from the first recording layer using the first format beam, the writing/reading unit 303 controls the first format beam in consideration of the reflectivity of the second recording layer with respect to the first format beam so that first format light reflected from the second recording layer is less than a predetermined level.

Figure 8:
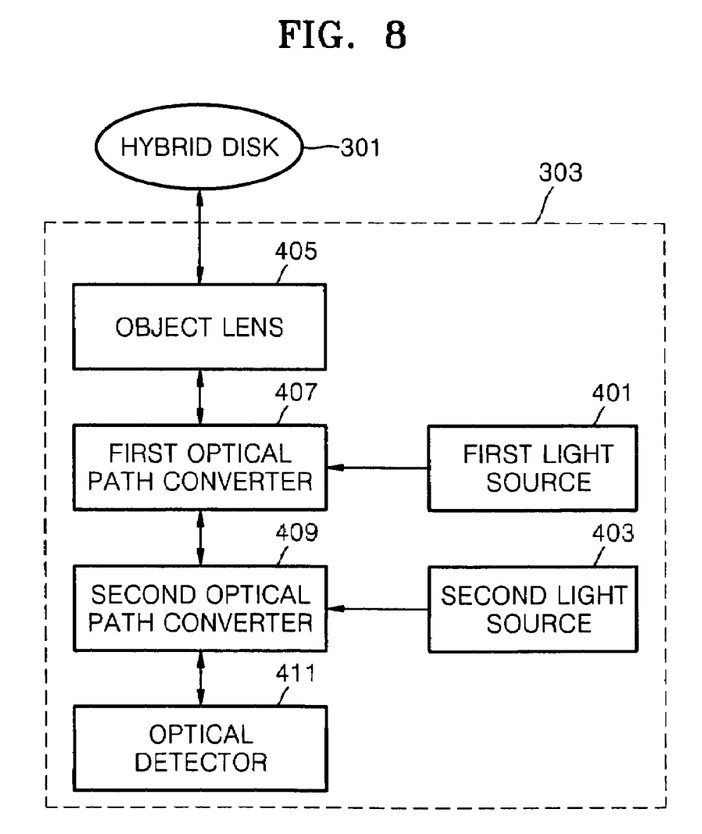
FIG. 8 is a view of a writing/reading unit shown in FIG. 7 according to an embodiment of the present invention.

The writing/reading unit 303 will now be described in more detail. FIG. 8 is a block diagram of an example of the writing/reading unit 303 shown in FIG. 7. In order for one or more object lens units to be compatible with the recording layers that are different in format from each other, the writing/reading unit 303 emits beams each having a wavelength appropriate for each recording layer to the hybrid disk 301 and receives the beams reflected from the hybrid disk 301 to detect an information signal and/or an error signal.

Referring to FIG. 8, the writing/reading unit 303 includes an object lens 405 forming a light spot on a recording surface of the hybrid disk 301 by focusing incident light, a first light source 401 emitting a first beam having a first wavelength, a second light source 403 emitting a beam having a second wavelength, first and second optical path converters 407 and 409 converting light paths of the beams emitted from first and second light sources 401 and 403, respectively, and an optical detector 411 detecting the information and/or error signal by receiving the beam reflected from the recording surface of the hybrid disk 301.

For example, when the first recording layer of the hybrid disk 301 has the DVD format, the first light source 401 is used as the DVD format light source emitting a beam having a wavelength of 650 nm to write and read data to and from the first recording layer. When the second recording layer of the hybrid disk 301 has the HD-DVD format, the second light source 403 is used as the HD-DVD format light source emitting a beam having a wavelength of 413 nm to write and read the data to and from the second recording layer.

By preventing the deterioration of the focus error signal caused by cross-talk between two or more recording layers of a hybrid disk that are different in format from each other, focus servo control can be stably performed.

Further, since two or more recording layers having different formats such as CD, DVD, HD-DVD, and BD are formed on a single disk, a user can enjoy the multimedia data using a system supporting a specific one of the formats or a system supporting all of the formats.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hybrid disk having a plurality of recording layers that are different in format from each other, comprising:
a first recording layer to and/or from which data is written or read by a first format beam; and a second recording layer to and/or from which data is written or read by a second format beam and which is further from an optical pickup than the first recording layer,
wherein a reflectivity of the first recording layer and a reflectivity of the second recording layer with respect to the first format beam are interrelated to control a percentage of light which is reflected after being transmitted to the second recording layer and reflected back through the first recording layer and which is less than the percentage of light which is reflected by the first recording layer with respect to the first format beam, and the first recording layer comprises at least one metal layer, and the second recording layer comprises at least two metal layers and at least one dielectric layer disposed between the at least two metal layers.

2. The hybrid disk of claim 1, wherein: the metal layer of the first recording layer is formed of Ni, the metal layers of the second recording layer are formed of Al, and the dielectric layer of the second recording layer is formed of $ZnS$—$SiO_2$.

3. The hybrid disk of claim 2, wherein a thickness of the metal layer of the first recording layer is about 35 nm.

4. The hybrid disk of claim 2, wherein a thickness of each metal layer of the second recording layer is about 10 nm.

5. The hybrid disk of claim 2, wherein a thickness of the dielectric layer of the second recording layer is less than about 25 nm.

6. A hybrid disk having a plurality of recording layers that are different in format from each other, comprising:
a first recording layer to and/or from which data is written or read by a first format beam; and
a second recording layer to and/or from which data is written or read by a second format beam and which is further from an optical pickup than the first recording layer,
wherein a reflectivity of the first recording layer and a reflectivity of the second recording layer with respect to the first format beam are interrelated to control a percentage of light which is reflected after being transmitted to the second recording layer and reflected back through the first recording layer and which is less than the percentage of light which is reflected by the first recording layer with respect to the first format beam, and the first recording layer comprises at least two metal layers and at least one dielectric layer disposed between the metal layers, and the second recording layer comprises at least one metal layer.

7. The hybrid disk of claim 6, wherein: the metal layers of the first recording layer are formed of Al, the dielectric layer of the first recording layer is formed of $ZnS$—$SiO_2$, and the metal layer of the second recording layer is formed of Al.

8. The hybrid disk of claim 7, wherein a thickness of each metal layer of the first recording layer is about 10 nm.

9. The hybrid disk of claim 7, wherein a thickness of the dielectric layer of the first recording layer is about 38 nm.

10. The hybrid disk of claim 7, wherein a thickness of the metal layer of the second recording layer is more than about 12 nm.

11. The hybrid disk of claim 1, wherein: the first recording layer has a DVD format, and the second recording layer has a HD-DVD format.

12. An apparatus for writing data to and/or reading data from a hybrid disk having a plurality of recording layers that are different in format from each other, the apparatus comprising:
a writing/reading unit writing the data to and/or reading the data from a first recording layer using a first format beam and/or writing the data to and/or reading the data from a second recording layer using a second format beam; and a control unit controlling the writing/reading unit to write or read the data to or from the hybrid disk based on a reflectivity of the second recording layer with respect to the first format beam so that an amount of the first format beam received by the writing/reading unit from the second recording layer is less than a predetermined level when writing the data to and/or reading the data from the first recording layer using the first format beam, wherein the first recording layer comprises at least one metal layer and the second recording layer comprises at least two metal layers and at least one dielectric layer.

13. An apparatus for writing data to and/or reading data from a hybrid disk having a plurality of recording layers that are different in format from each other, the apparatus comprising:

a writing/reading unit writing the data to and/or reading the data from a first recording layer using a first format beam and/or writing the data to and/or reading the data from a second recording layer using a second format beam; and a control unit controlling the writing/reading unit to write or read the data to or from the hybrid disk based on a reflectivity of the second recording layer with respect to the first format beam so that an amount of the first format beam received by the writing/reading unit from the second recording layer is less than a predetermined level when writing the data to and/or reading the data from the first recording layer using the first format beam wherein the first recording layer comprises at least two metal layers and at least one dielectric layer and the second recording layer comprises at least one metal layer.

14. A method of writing data to and/or reading data from a hybrid disk having a plurality of recording layers that are different in format from each other, the method comprising:

writing or reading the data to or from a first recording layer of the hybrid disk using a first format beam;

writing or reading the data to or from a second recording layer of the hybrid disk using a second format beam, controlling the first format beam based on a reflectivity of the second recording layer with respect to the first format beam so that an amount of the first format beam reflected from the second recording layer is less than a predetermined level when writing or reading the data to or from the first recording layer using the first format beam, wherein the first recording layer comprises at least one metal layer and the second recording layer comprises at least two metal layers and at least one dielectric layer.

15. A method of writing data to and/or reading data from a hybrid disk having a plurality of recording layers that are different in format from each other, the method comprising:

writing or reading the data to or from a first recording layer of the hybrid disk using a first format beam;

writing or reading the data to or from a second recording layer of the hybrid disk using a second format beam, controlling the first format beam based on a reflectivity of the second recording layer with respect to the first format beam so that an amount of the first format beam reflected from the second recording layer is less than a predetermined level when writing or reading the data to or from the first recording layer using the first format beam, wherein the first recording layer comprises at least two metal layers and at least one dielectric layer and the second recording layer comprises at least one metal layer.

16. A hybrid disk useable with a recording and or reproducible apparatus having an optical pickup, the hybrid disk comprising:

a first recording layer having a first format on which data is recordable or readable by a first format beam; and a second recording layer having a second format on which the data is recordable or readable by a second format beam; wherein a transmissivity of the first recording layer and a reflectivity of the second recording layer are interrelated to control relative intensities of the first and second format beams incident on the optical pickup, wherein: the first recording layer comprises at least one metal layer; the second recording layer comprises at least two metal layers and at least one dielectric layer, and the transmissivity of the first recording layer and the reflectivity of the second recording layer are interrelated according to $(T_{12})^2 \times R_{22} > 0.18$, where $T_{12}$ is the transmissivity of the first recording layer with respect to the second format beam and $R_{22}$ is the reflectivity of the second recording layer with respect to the second format beam.

17. The hybrid disk of claim 16, wherein: the transmissivity of the first recording layer and the reflectivity of the second recording layer are further interrelated according to $(T_{11})^2 \times R_{21} < 0.05$, where $T_{11}$ is the transmissivity of the first recording layer with respect to the first format beam and $R_{21}$ is the reflectivity of the second recording layer with respect to the first format beam.

18. The hybrid disk of claim 17, wherein: $T_{11}$ is about 0.8, $T_{12}$ is about 0.5, $R_{22}$ is greater than about 0.72 and $R_{21}$ is in a range of 0 to 1.

19. A hybrid disk useable with a recording and or reproducible apparatus having an optical pickup, the hybrid disk comprising:

a first recording layer having a first format on which data is recordable or readable by a first format beam; and a second recording layer having a second format on which the data is recordable or readable by a second format beam; wherein a transmissivity of the first recording layer and a reflectivity of the second recording layer are interrelated to control relative intensities of the first and second format beams incident on the optical pickup, wherein: the first recording layer comprises at least two metal layers and at least one dielectric layer; second recording layer comprises at least one metal layer; and the transmissivity of the first recording layer and the reflectivity of the second recording layer are interrelated according to $(T_{12})^2 \times R_{22} > 0.18$, where $T_{12}$ is the transmissivity of the first recording layer with respect to the second format beam and $R_{22}$ is the reflectivity of the second recording layer with respect to the second format beam.

20. The hybrid disk of claim 19, wherein: the transmissivity of the first recording layer and the reflectivity of the second recording layer are further interrelated by $(T_{11})^2 \times R_{21} < 0.05$, where $T_{11}$, is the transmissivity of the first recording layer with respect to the first format beam and $R_{21}$ is the reflectivity of the second recording layer with respect to the first format beam.

21. The hybrid disk of claim 20, wherein: $T_{11}$ is about 0.12, $T_{12}$ is about 0.5 and $R_{21}$ and $R_{22}$ are each greater than about 0.72.

* * * * *